July 9, 1968  P. J. ZERWES  3,392,228
GASKET FOR WEATHER-PROOFING JUNCTION BOX
Filed June 22, 1966
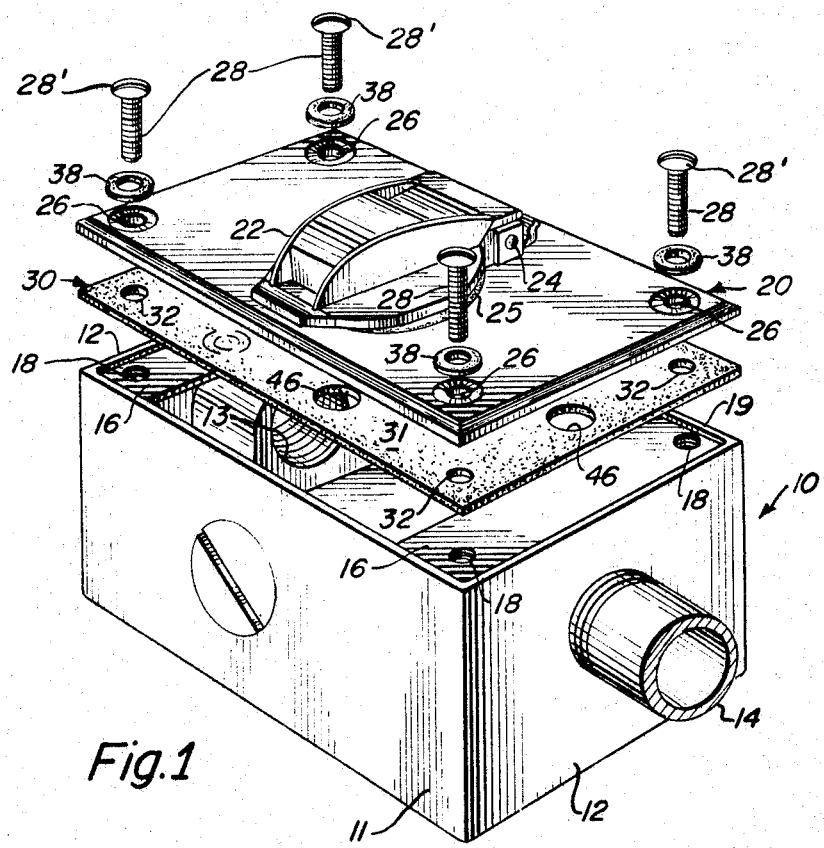
Fig. 1
Fig. 2
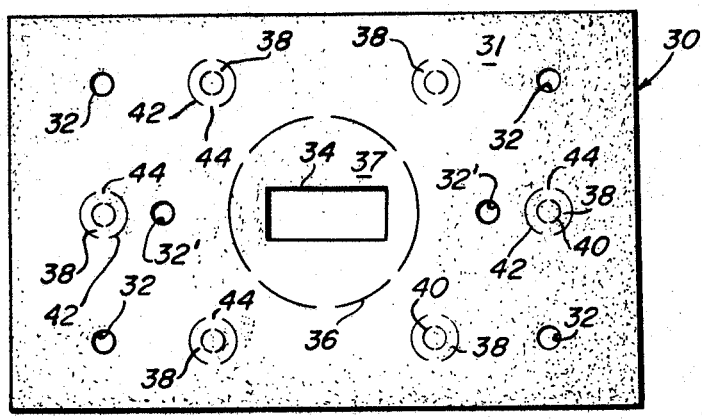
INVENTOR
PAUL J. ZERWES
BY *Silverman & Cass*
ATTORNEYS United States Patent Office 3,392,228
Patented July 9, 1968

3,392,228
GASKET FOR WEATHER-PROOFING
JUNCTION BOX
Paul J. Zerwes, Chicago, Ill., assignor to Bell Electric Co.,
Chicago, Ill., a corporation of Illinois
Filed June 22, 1966, Ser. No. 559,514
6 Claims. (Cl. 174—52)

ABSTRACT OF THE DISCLOSURE

A sealing gasket for a junction box. The gasket has knock-out washers which are placed between the cover plate and the screw heads to seal the screw holes.

---

This invention relates to new and useful improvements in so-called electrical junction boxes also known as electrical outlet boxes of the type used in outdoor and wet environmental conditions and more particularly to an improved gasket for use in weather-proofing such a box.

Electrical junction or outlet box installations of the type with which this invention is concerned are used under outdoor and wet environmental conditions and, hence must be weather-proofed particularly so that no moisture can penetrate into interior of the assembled structure. Such outlet box installations generally include two main elements, one of which being the outlet box for accommodating electrical switches, receptacles, wiring devices and the like, and the other element being a cover plate intended to be removably attached to the outlet box, once suitable electrical connections have been made, so as to seal off same. The necessity of providing an open top box for access to the box and a removable cover plate so as to permit future access to the interior of the outlet box when desirable brings the weather-proofing problem into focus.

In the past, electrical outlet boxes of the type concerned herein have been supplied generally in kit form, with a suitable rubber-like gasket to be positioned between the cover plate and outlet box before the two are secured together. Securement usually is accomplished by screws, also supplied with the outlet box kit. The rubber gasket, by itself, fails to insure a completely satisfactory and truly weather-proof seal between the cover plate and outlet box. Normally, rubber washers are desirably installed between the screw heads and the cover plate so as to seal off the screw openings. Without the use of such washers, seepage could occur into the outlet box through the screw holes notwithstanding the tightness of the screw connection. Therefore, in order to assure a truly weather-proof installation, the commercially sold outlet box kit includes a separate set of washers for use in assembly. The practice in the past has been to supply a number of these washers in a small bag, along with the screws used to secure the cover plate to the box.

The need for supplying a plurality of small sealing washers in the commercially sold outlet box kit presents inconveniences and adds production costs which are eliminated by my improvement. The washers may be easily lost or misplaced on the job site. Production and handling costs also are increased because the washers, although generally of the same material as the sealing gasket, are necessarily die-cut in an operation other than that which produces the gasket. The washers also are cut from a separate piece of material, producing needless scrap. Further, use of the prior art sealing washers requires a separate sorting and packing step in production, thereby additionally increasing costs.

Also of note is the fact that while the so-called junction boxes of the character concerned herein are of standardized size and configuration, the number of screws required to install the cover plate thereon differs from one to the other depending upon the specific use to which a particular box may be put. Thus, while one plate may be fastened by two screws, another may require four or perhaps even six. Six screws seem generally to be the maximum but the normal requirement is four in number. Thus the extra sorting step. It would be advantageous to supply one package of washers useful for inclusion in kits for multipurpose use. The commercially sold kit must provide a sufficient number of washers based upon the number of screws utilized in installation. Thus, in many instances extra washers are provided in the kits and not used. These become discarded or lost. The installed washers may well need replacement in time and then no substitute washer is instantly available. Thus it would be advantageous additionally to provide reserve washers which cannot be lost, misplaced or discarded.

Accordingly, the principal object of the invention is to provide a sealing gasket for use in weather-proofing electrical junction or outlet box installations which gasket carries thereon whatever washers are required for assembly of said weather-proofed installation and thereby, eliminates the problems described above with a substantial savings in cost of fabrication and material.

Another object of this invention is to provide a sealing gasket for use in weather-proofing an electrical junction or outlet box installation, which gasket carries a plurality of sealing washers severably connected in the body thereof and adapted selectively to be removed for assembly of said installation.

Yet a further object of this invention is to provide a sealing gasket for a weatherproof electrical junction box installation which carries in the body thereof, its own washers in a number at least equal to the maximum than commonly required for standardized installations, said washers being spaced inward of the periphery of said body and each being defined by a central through-cut and an interrupted cut concentric with said central cut, said washers adapted selectively to be detached from the gasket body for use, with those washers not being used remaining attached to the body, the locations of each of said washers in the body chosen so as not to interfere with either the sealing capability of the gasket or the standardized passageways therein provided to accommodate the screws therethrough during assembly of said box installation.

Other objects of the invention include the provision of a sealing gasket for weatherproofing an outlet box installation which gasket is of simple construction, is inexpensive to manufacture, can be installed in a minimum amount of time, and is efficient, versatile and safe for use.

Many other objects and advantages of my invention will be forthcoming in the course of the detailed description of a preferred embodiment thereof with reference to the accompanying drawings in which:

FIG. 1 is an exploded perspective view of a weatherproof electrical outlet box installation utilizing the gasket of the invention and illustrating the relative position of the elements thereof during assembly.

FIG. 2 is a plan view of the gasket in accordance with the invention, illustrated prior to the removal of any washers therefrom.

Referring now to the drawings, the gasket constructed in accordance with the herein invention is designated generally by reference character 30 and particularly is suitable for use with an electrical outlet box of standardized size and configuration comprising a body portion 10 having a pair of spaced side walls 11 and opposite end walls 12. Known means are provided to mount an electrical wiring device receptacle or switch to the body 10. The entire body portion 10 preferably is cast of aluminum, although any suitable material may be used. One or more internally threaded openings 13 are provided in each end wall 12 for receiving various types of conduit 14 carrying electrical leads or the like (not shown). A pair of mounting plates 16 are provided bridging opposite side walls 11 and being substantially flush to the edge 19 of the box 10. The plates 16 have formed therein, at standardized locations thereon, a plurality of threaded screw holes 18 to coincide with standardized, preferably counter-sunk, openings 26 formed in cover plate 20 to enable installation thereof.

Depending upon the type of installation, cover plate 20 may be a planar metal plate preferably of cast aluminum. One or more receptacle snap-covers 22 may be provided on the plate 20 hinged thereto as by means of a pin 24. A rubber gasket 25 is disposed within the cover 22 to seal off the receptacle. As described, the cover plate 20 has holes 26 at standardized locations which align with holes 18 of the outlet box 10 when the plate is juxtaposed on the outlet box. Screws 28 of a size and configuration for passage through holes 18 and 26 are provided for securing plate 20 on box 10.

A gasket member ordinarily is provided to be disposed between the box 10 and the cover plate 20 for sealing purposes. The herein invention is concerned with an improved gasket generally designated by reference character 30, shown in FIG. 1 during assembly of the installation and, in FIG. 2 prior to such assembly.

In FIG. 2 there is illustrated the die-cut gasket member 30 according to the invention, of size and configuration suitable for positioning between cover 20 and box 10 to form a weatherproof seal therebetween. Gasket 30 preferably is formed of a neoprene rubber body 31, although any suitable water-resistant electrical insulating material may be used. A plurality of passageways 32, defined by uninterrupted cuts, formed in the gasket 30 are disposed at standardized locations on the body 31 including ones spaced inwardly of each corner of the gasket to coincide with screw holes 18 and 26 of the outlet box and cover plate respectively. In some instances, openings may be provided in the cover plate which are off-set from the center thereof to accommodate screws intended to be threaded through aligned openings in the electrical receptacle mounted in the box 10. For this reason, additional passageways 32' also are formed which would coincide with such extra openings in instances where they are provided. This enhances the universality of gasket 30.

A rectangular-shaped uninterrupted cut to define a rectangular passageway 34 is made in the central portion of said body 31, the sides of which are parallel to the appropriate edges of the gasket 30 with the longer dimension of passageway 34 being along the longer dimensional edge of the gasket. The dimensions of the rectangular passageway 34 are standardized to receive therethrough the ordinary household toggle-type switch handle, should such switch device to be installed in the box 10. Surrounding such opening 34, and concentric therewith is a circular interrupted cut 36 defining a removable portion 37. Where the receptacle installed in box 10 is an electrical socket of circular, outwardly facing surface configuration, such as covered by cover 22 in FIG. 1, portion 37 may be detached from gasket body 31 to form a passageway, the edge of which surrounds the edge of said socket. If the user chooses to use the junction box to house an electrical toggle switch, he will not disturb the portion 37 of the gasket body 31. However, if the outlet box is used to house an electrical socket, the user will punch out the portion 37 of the gasket body 31 and thus will have a gasket suitable for use with such electrical wiring device.

It has been recognized that the provision of a rubber gasket disposed between the face of an electrical outlet box and the cover plate therefor is not in itself sufficient to create a weather-proof box installation. In order to affect weather-proofing, sealing washers such as those indicated at 38, are required to be placed between the heads 28' of screws 28 and the cover plate 20.

According to the herein invention, the said washers 38 are formed and stored in the gasket body 31 as shown in FIG. 2. The washers 38 are disposed in gasket body 31 at locations which will not interfere with the various other cuts 32, 32', 34 and 36 provided in the gasket. The washers also are located in areas which will not inhibit the sealing characteristics of the gasket, i.e., hence they are located a distance inwardly of the marginal edge of body 31 and spaced away from next adjacent holes 32' of the gasket. Thus, removal of any of the washers from the body 31 will not effect the sealing attributes of the remainder of the gasket 30.

It will be appreciated that the number of securing screws 38 used to secure cover plate 20 to junction box 10 may vary depending on the particular type of electrical receptical or control device with which the cover plate is to be used. Thus, although the marginal dimensions of the gasket 30 are such that the gasket can be used in conjunction with any standard junction box of similar size and configuration, the number of washers essential to effect a weather-proof seal will vary with the number of screws needed.

Generally, the number of screws used in a standard junction box will vary between two and six. An important feature of my invention is that the gasket 30 is provided preformed therein with the maximum number of washers that may be required. If less than the maximum number is needed to assemble a given box, as is illustrated in FIG. 1, then the user merely leaves unsevered the unneeded washers and they remain attached to the gasket. A further important advantage of this feature is that, in the event less than the maximum number of screws are necessary for assembly of the junction box, the user has a conveniently available replacement washer carried on the gasket for use in substitution for one which may have lost its sealing properties in use, say through exposure over a long period to adverse weather conditions.

Thus, I have supplied the maximum number of washers which must be used with any standardized junction box, of similar size and configuration, and I have done so in one manufacturing operation. Further, in many cases my gasket will have the added advantage of providing a replacement washer should the use of one become necessary through prolonged use of the junction box.

The washers 38 provided by the invention are formed in the shape of a flat toroid. The inner central opening of washer 38 is defined by an uninterrupted circular cut 40 of a diameter approximating the diameter of passageway 32 whereby to accommodate screws 28 therethrough. A tight or friction fit between screw 28 and the edge of the opening defined by cut 40 is desirable for weather-proof expedience. The outer diameter of each washer 38 is defined by an interrupted cut 42 concentric with cut 40 formed in body 31. The diameter of cut 42, of course, must be greater than the diameter of the head 28' of screw 28 so as to achieve the desired weather-proof seal when the outlet box installation is completed. Since interrupted cut 42 is used to define the outer perimeter of washer 38, the washer is severably connected to gasket 30 by the unscored portions 44 until the user is ready to assemble the outlet box as a weather-proof installation. A partial view of gasket 30 is shown in FIG. 1 with four of the washers 38 removed and in position for assembly. Holes 46 illustrate the voids remaining after the selected washers 38 have been removed from the gasket 30. It is evident that the voids 46 will have no deleterious effect upon the sealing characteristics of the gasket 30.

In use of my invention, the purchaser of a junction box will find the necessary washers for a waterproof assembly conveniently attached to a supplied gasket. The user will proceed to disengage, from the gasket, the number of washers 38 needed to effectuate the weather-proof assembly. There will be no danger of loss of these essential washers before assembly, for they will be carried on the gasket until removed for use.

Whichever washers are unused remain carried on the gasket, perhaps for future replacement use.

Portions 44 defined between interrupted cuts 42 preferably should be held to a minimum to facilitate removal of the washers 38. In practice, I have found that a desirable tolerance for portions 44 can be held between 1/32 and 1/16 inch.

Where the gaskets 30 are intended for storage for a relatively extended period before use, the interrupted cuts 42 may be less than clean through the thickness of the gasket on opposed sides of the gasket so that a very thin middle portion remains. This thin portion aids in preventing distortion or deformation of the axial gasket during relatively extended storage. Where a standard gasket of 1/16 inch thickness is used, I have found that the interrupted cuts 42 should preferably have an uncut thickness of .002–.003 inch. Preferably the cuts are formed by opposed blades so that the uncut thickness is generally midway between the opposite planar surfaces of the gasket body 31.

It should be understood that the term "electrical receptacle" or "control device" which may be housed in the outlet box may comprise switches, receptacles, plugs, etc. For the purpose of the claims appended hereto, the term "electrical apparatus" will be used to denote the apparatus housed in the junction box without limitation.

While I have shown and described a preferred embodiment of the invention, it is to be appreciated that the drawing and detailed description thereof are intended to be construed in an illustrative rather than a limiting manner since various modifications and substitutions of equivalents may well be made by those skilled in this art within the spirit and scope of the invention as defined in the appended claims.

What it is desired to be secured by Letters Patent of the United States is:

I claim:

1. A gasket of electrical insulating material for weather-proofing an electrical outlet box installation which includes a cover plate, a housing for electrical apparatus and a plurality of assembly screws comprising: a plurality of first openings formed in said gasket at standardized locations thereon of size and configuration to pass said assembly screws therethrough; and, a plurality of severably connected washers carried by said gasket randomly located at areas spaced from the first openings and the peripheral edge of the gasket, said washers being defined by an inner through-cut forming a passageway to define the inner diameter of the washer and an interrupted cut concentric with said inner through-cut to define the outer diameter of the washer, said washers adapted to be selectively detached for use in conjunction with use of said assembly screws.

2. A gasket as claimed in claim 1 in which there is a central passage formed therein of size and configuration to accommodate a standard electrical fitting therethrough and a concentric interrupted cut to define a selectively severable portion of size and configuration to define a passageway for accommodating a larger electrical fitting therethrough should the latter be employed in the installation.

3. A gasket as claimed in claim 1 in which the number of severably connected washers provided is greater than the number of assembly screws required for the installation.

4. A gasket as claimed in claim 1 in which said interrupted cuts are made partially through the thickness of the gasket.

5. A gasket as claimed in claim 1 in which the spacing between adjacent interrupted cuts is maintained at a minimum.

6. In a weather-proof electrical outlet box installation which includes a receptacle for holding mounted therein electrical apparatus, an electrical apparatus mounted therein opening to a face thereof, disposed over the face a weather-proofing gasket and a cover plate disposed over the gasket, and fastening means for securing the cover-plate to the receptacle, the herein improvement comprising the gasket having a plurality of concentrically arranged cuts, the inner one of said cuts being continuous and the outer one of said cuts being interrupted, said cuts defining a plurality of sealing washers severably connected to the gasket and capable of selective disengagement from the gasket for use in assembly of said outlet box installation.

References Cited

UNITED STATES PATENTS 2,985,291   5/1961   Schoepe et al. _____ 285—3 X

LEWIS H. MYERS, *Primary Examiner.*

D. A. TONE, *Assistant Examiner.*